United States Patent
Siomina et al.

(10) Patent No.: US 10,231,279 B2
(45) Date of Patent: Mar. 12, 2019

(54) HANDLING D2D RESOURCE GRANT PROCEDURES

(71) Applicant: Telefonaktiebolaget LM Ericsson (publ), Stockholm (SE)

(72) Inventors: Iana Siomina, Täby (SE); Qianxi Lu, Beijing (CN); Yunxi Li, Järfälla (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 20 days.

(21) Appl. No.: 15/327,897

(22) PCT Filed: Aug. 7, 2015

(86) PCT No.: PCT/EP2015/068275
§ 371 (c)(1),
(2) Date: Jan. 20, 2017

(87) PCT Pub. No.: WO2016/020533
PCT Pub. Date: Feb. 11, 2016

(65) Prior Publication Data
US 2017/0208646 A1    Jul. 20, 2017

(30) Foreign Application Priority Data
Aug. 8, 2014    (WO) ................ PCT/CN2014/084038

(51) Int. Cl.
*H04W 76/04*    (2009.01)
*H04W 72/14*    (2009.01)
(Continued)

(52) U.S. Cl.
CPC ............ *H04W 76/25* (2018.02); *H04W 4/80* (2018.02); *H04W 72/14* (2013.01);
(Continued)

(58) Field of Classification Search
None
See application file for complete search history.

(56) References Cited

U.S. PATENT DOCUMENTS

2013/0324114 A1    12/2013 Raghothaman et al.
2013/0336111 A1 *  12/2013 Vos ..................... H04W 48/08
                                                        370/230
(Continued)

OTHER PUBLICATIONS

Author Unknown, "Technical Specification Group Services and System Aspects; Feasibility study for Proximity Services (ProSe) (Release 12)," Technical Report 22.803, Version 12.2.0, 3GPP Organizational Partners, Jun. 2013, 45 pages.
(Continued)

*Primary Examiner* — Candal Elpenord
(74) *Attorney, Agent, or Firm* — Patent Portfolio Builders, PLLC

(57) ABSTRACT

There is discussed a Device-to-Device (D2D) enabled node for a wireless communication network. The D2D enabled node is adapted for determining that a D2D resource grant expected by the D2D enabled node is not received from a network node, wherein the D2D enabled node is further adapted for performing one or more actions in response to the determining that the grant is not received. There are also discussed related nodes and methods.

6 Claims, 11 Drawing Sheets

(51) Int. Cl.
*H04W 74/08* (2009.01)
*H04W 76/25* (2018.01)
*H04W 76/14* (2018.01)
*H04W 4/80* (2018.01)
*H04W 88/06* (2009.01)
*H04W 92/18* (2009.01)

(52) U.S. Cl.
CPC ....... *H04W 74/0833* (2013.01); *H04W 76/14* (2018.02); *H04W 88/06* (2013.01); *H04W 92/18* (2013.01)

(56) References Cited

U.S. PATENT DOCUMENTS

| | | | | |
|---|---|---|---|---|
| 2014/0031063 | A1* | 1/2014 | Park | H04W 8/186 455/456.1 |
| 2014/0133332 | A1 | 5/2014 | Lee | |
| 2015/0078279 | A1* | 3/2015 | Ko | H04W 76/14 370/329 |
| 2015/0117332 | A1* | 4/2015 | Li | H04W 76/18 370/329 |
| 2015/0215981 | A1* | 7/2015 | Patil | H04W 76/023 370/329 |
| 2015/0312953 | A1* | 10/2015 | Wang | H04L 1/00 370/312 |
| 2015/0327312 | A1* | 11/2015 | Burbidge | H04W 72/14 370/329 |
| 2016/0183276 | A1* | 6/2016 | Marinier | H04W 72/02 370/329 |

OTHER PUBLICATIONS

Raghothaman, Balaji et al., "Architecture and Protocols for LTE-based Device to Device Communication," International Conference on Computing, Networking and Communications (ICNC), Jan. 28-31, 2013, IEEE, pp. 895-899.
International Search Report and Written Opinion for International Patent Application No. PCT/EP2015/068275, dated Oct. 5, 2015, 9 pages.

* cited by examiner

HANDLING D2D RESOURCE GRANT PROCEDURES

This application is a 35 U.S.C. § 371 national phase filing of International Application No. PCT/EP2015/068275, filed Aug. 7, 2015, which claims priority to International Application No. PCT/CN2014/084038, filed Aug. 8, 2014, the disclosures of which are incorporated herein by reference in their entireties.

TECHNICAL FIELD

The present disclosure pertains to handling D2D resource grants in the context of wireless communication technology.

BACKGROUND

A new type of resource grant was agreed for D2D, but means for determining and handling such situations like not receiving a D2D resource grant by a UE are not identified. Such situation may result in unspecified and unpredictable UE behaviors depending on implementation or in a non-desirable UE behavior like e.g. initiating a cellular random access procedure upon determining that some grant is not received.

SUMMARY

An object of the present disclosure is to provide improved ways of handling situations in which a D2D resource grant is not received by a D2D enabled node.

There is disclosed a D2D enabled node for a wireless communication network. The D2D enabled node is adapted for determining that a D2D resource grant expected by the D2D enabled node is not received from a network node, the D2D enabled node further being adapted for performing one or more actions in response to the determining that the grant is not received. Based on the determination of a missing grant, suitable actions may be taken by the D2D enabled node.

Moreover, a method performed by a D2D enabled node for a wireless communication network is disclosed. The method comprises determining that a D2D resource grant expected by the D2D enabled node is not received from a network node. The method also comprises performing one or more actions in response to the determining that the grant is not received.

A network node for a wireless communication network is suggested. The network node is adapted to instruct a D2D enabled node to trigger a random access procedure to perform switching of the D2D enabled node for a D2D operation mode to a cellular operation mode. This allows changing the operational mode of the D2D enabled node, e.g. in response to a received ProSe BSR.

There is also disclosed a method performed by a network node for a wireless communication network. The method comprises instructing a D2D enabled node to trigger a random access procedure to perform switching of the D2D enabled node for a D2D operation mode to a cellular operation mode.

A computer program product comprising instructions executable by control circuitry is considered. The instructions cause the control circuitry to carry out and/or control any of the methods described herein when executed by the control circuitry.

Moreover, there is disclosed a storage medium adapted to store instructions executable by control circuitry, the instructions causing the control circuitry to carry out and/or control any of the methods described herein.

BRIEF DESCRIPTION OF THE DRAWINGS

The drawings are provided to illuminate and illustrate concepts described herein, without limiting them to the subject matter shown in the figures, which show.

DETAILED DESCRIPTION

In a cellular network, the UE monitors a DL control channel and receives a resource grant for UL transmissions for this specific UE. One of the UE behaviors when the UL resource grant is not received is to initiate a random access procedure, assuming that the reason for not receiving the grant is lost synchronization with the network, which is crucial for cellular operation but not that crucial for D2D.

Figure 2:
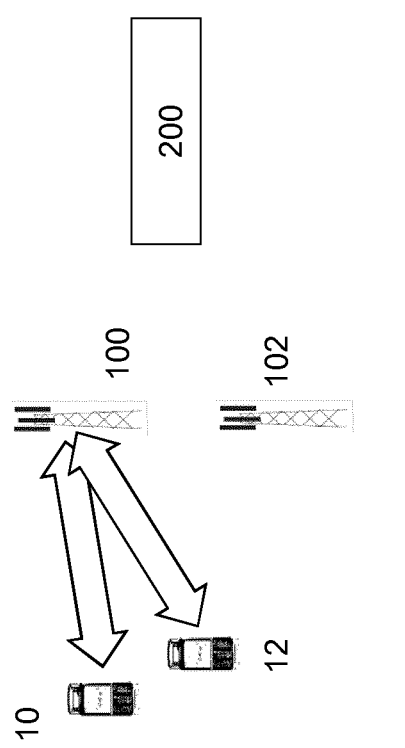
FIG. 2 a "Locally-routed" data path in the EPS for communication between two UEs when UEs are served by the same eNBs.
Figure 3:
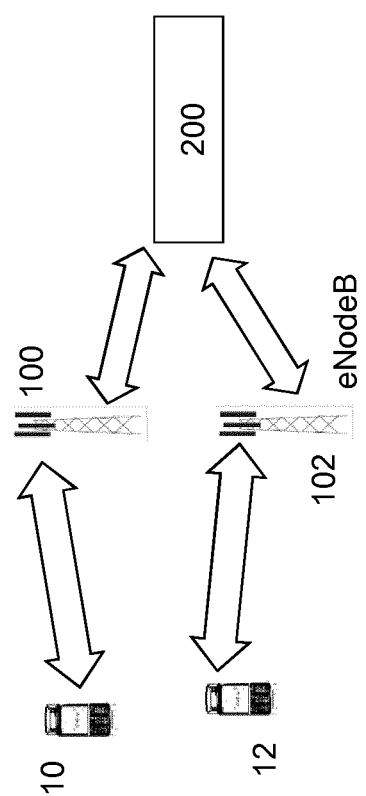
FIG. 3 a default data path scenario in the EPS for cellular communication between two UEs.

If UEs are in proximity to each other, they may be able to use a "direct mode" (e.g., as in FIG. 1) or "locally-routed" (e.g., as in FIG. 2) path for data communication, unlike in the conventional cellular communication (FIG. 3). In such device-to-device communication (D2D), which may also be called "ProSe" (for PROximity SErvices), the source and the target are wireless devices like D2D enabled nodes, e.g., UEs. Some of the potential advantages of D2D or ProSe are off-loading of the cellular network, faster communication, increased awareness of surrounding wireless devices of interest (e.g., running the same application), higher-quality links due to a shorter distance, etc. Some appealing applications of D2D communications are video streaming, online gaming, media downloading, peer-to-peer (P2P), file sharing, etc.

Generally, a UE may be considered as an example or representative of a D2D enabled node, and the term D2D enabled node may be interchanged for UE unless explicitly stated otherwise.

Figure 1:
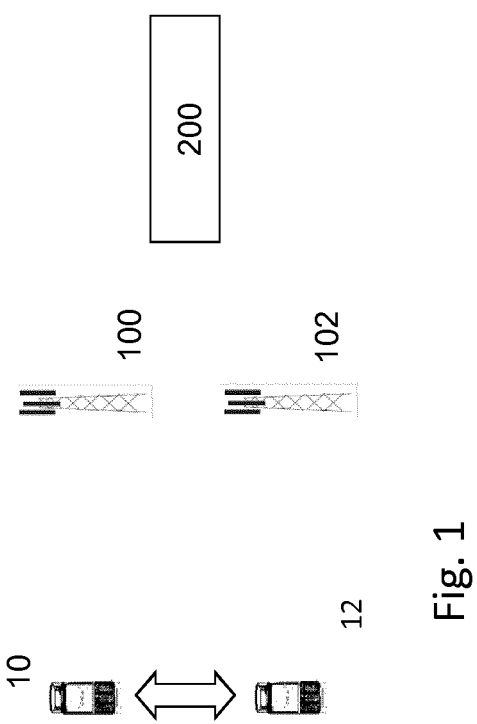
FIG. 1 a "Direct mode" data path in the EPS for communication between two UEs.

In FIGS. 1 to 3, there are shown different setups for communication of user equipments within a wireless communication network. In these figures, the first node or first user equipment UE1 is indicated with reference numeral 10, the second node or second user equipment is indicated with reference numeral 12. A first base station, which may be an eNodeB and/or EPC according to LTE/E-UTRAN, carries the reference numeral 100, whereas a second base station, which may be an eNodeB and/or EPC according to LTE/UTRAN, is referenced with numeral 102. The nodes 100, 102 may be configured as coordinating nodes for D2D communication between the UEs 10, 12. Reference numeral 200 indicates higher layer functions or devices of the network, to which the base stations 100, 102 may be connected or connectable, e.g. LTE packet core elements like SGW (Server GateWay) and/or PGW (PDN GateWay) and/or MME (Mobility Management Entity).

If UEs 100, 102 are in proximity to each other, they may be able to use a "direct mode" (e.g., as in FIG. 1) or "locally-routed" (e.g., as in FIG. 2) path for data communication, unlike in the conventional cellular communication (FIG. 3).

Figure 4:
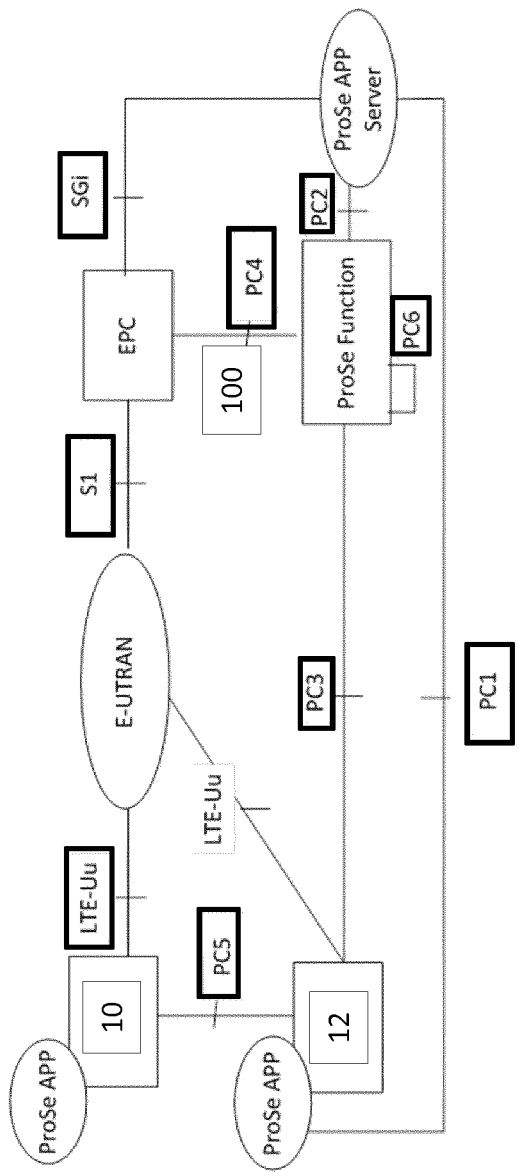
FIG. 4 an exemplary D2D architecture.

A more detailed example reference architecture for D2D operation according to one possible LTE/E-UTRAN implementation is illustrated in FIG. 4, in which only a setup with two UEs 10, 12 connected to a common base station or eNodeB 100 is shown. In FIG. 4, PCn identifies different reference points or interfaces. PC1 refers to a reference point between a ProSe application ProSe APP running on an D2D enabled node or UE 10 or 12, PC2 a reference point between an ProSe Application server and a ProSe function provider on a server or base station side. PC3 indicates a reference point between the D2D enabled node or UE 12 and the ProSE function, e.g. for discovery and/or communication. PC4 refers to a reference point between the EPC and the ProSe function, e.g. for setting up setting up one-to-one communication between UEs 10 and 12. PC5 is a reference point between D2D enabled node or UE 10 and D2D enabled node or UE 12, e.g. a first node and a second node involved in D2D communication, which may be used e.g. for direct or relayed communication between the UEs. PC6 identifies a reference point between ProSE functions of different networks, e.g. if UEs 10, 12 are subscribed to different PLMNs (Public Land Mobile Networks). SGi indicates an interface which may be used, inter alia, for application data and/or application level control. The EPC (Evolved Packet Core) may generally include a plurality of core packet functions or entities, e.g. MME, SGW, PWG, PCRF (Policy Charging and Rules Function), HSS (Home Subscriber Server), etc. E-UTRAN is the preferred RAT of the arrangement of FIG. 4. LTE-Uu indicates data transmission connections between the UEs 10, 12 and the base station 100.

Figure 5:
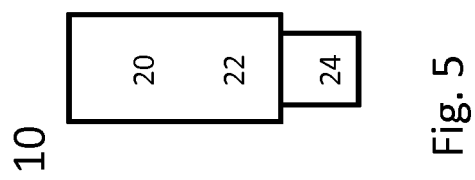
FIG. 5 an exemplary D2D enabled node or UE.

FIG. 5 schematically shows a D2D enabled node or user equipment 10, which may be a node of a device-to-device communication, in closer details. User equipment 10 comprises control circuitry 20, which may comprise a controller connected to a memory. An receiving module and/or transmission module and/or control module may be implemented in the control circuitry 20, in particular as module in the controller. The user equipment also comprises radio circuitry 22 providing receiving and transmitting or transceiving functionality, the radio circuitry 22 connected or connectable to the control circuitry. An antenna circuitry 24 of the user equipment 10 is connected or connectable to the radio circuitry 22 to collect or send and/or amplify signals. Radio circuitry 22 and the control circuitry 20 controlling it are configured for device-to-device communication, in particular utilizing E-UTRAN/LTE resources as described herein and/or receiving allocation data and/or transmit D2D data based on allocation data.

Figure 6:
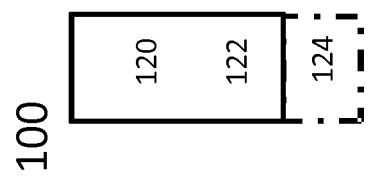
FIG. 6 an exemplary base station.

FIG. 6 schematically show a base station 100, which in particular may be an eNodeB. Base station 100 comprises control circuitry 120, which may comprise a controller connected to a memory. A configuring unit and/or a determination unit may be comprised in the control circuitry, the latter in particular if the base station is configured as a coordinating node. The control circuitry is connected to control radio circuitry 122 of the base station 100, which provides receiver and transmitter and/or transceiver functionality. It may be considered that control circuitry 120 comprises an extracting unit as described herein, in particular if the base station is configured to participate as a device in D2D communication. An antenna circuitry 124 may be connected or connectable to radio circuitry 122 to provide good signal reception or transmittance and/or amplification.

A ProSe resource grant (also called network grant) for scheduling assignments (SA) and D2D data may be transmitted using PDCCH or EPDCCH. The grant or corresponding allocation data may be scrambled with a D2D enabled node-specific or UE-specific scrambling code or RNTI, e.g. with a specific ProSe RNTI, and may be sent (for example, by a network node or base station or coordinating node or allocation node) in response to receiving and/or determining a ProSe buffer status report (BSR) indicating the buffer status for ProSe data, in particular the corresponding status on the D2D enabled node or UE. Prior to sending the ProSe BSR, the D2D enabled node or UE may request UL resources for transmitting the BSR. A grant may be included or represented by allocation data, which may be transmitted from the network or a network node like an allocation node or base station or eNB to the D2D enabled node or UE. In a normal situation, after sending a ProSe BSR, the D2D enabled node or UE receives a ProSe resource grant or allocation data for SA and ProSe data transmissions. However, some uncertain situations may occur when the D2D enabled node UE does not receive the grant for some reason, e.g., the grant or allocation data has not been sent due to different reasons, or the UE failed to receive the grant that has been transmitted.

This may also include the case in which allocation data is received, but a grant of resources is rejected.

Requesting/sending ProSe resource grant procedures are typically associated with D2D enabled nodes or UEs with so-called Mode 1 resource allocation type (at a high-level, Mode 1 is network-controlled resource allocation for D2D, while Mode 2 is D2D enabled node or UE autonomous resource selection for D2D which is relevant mostly when the D2D enabled node or UE is out of cellular network coverage although Mode 2 may be operated also within the network coverage), but the approaches described therein may not be limited to this terminology.

Figure 7:
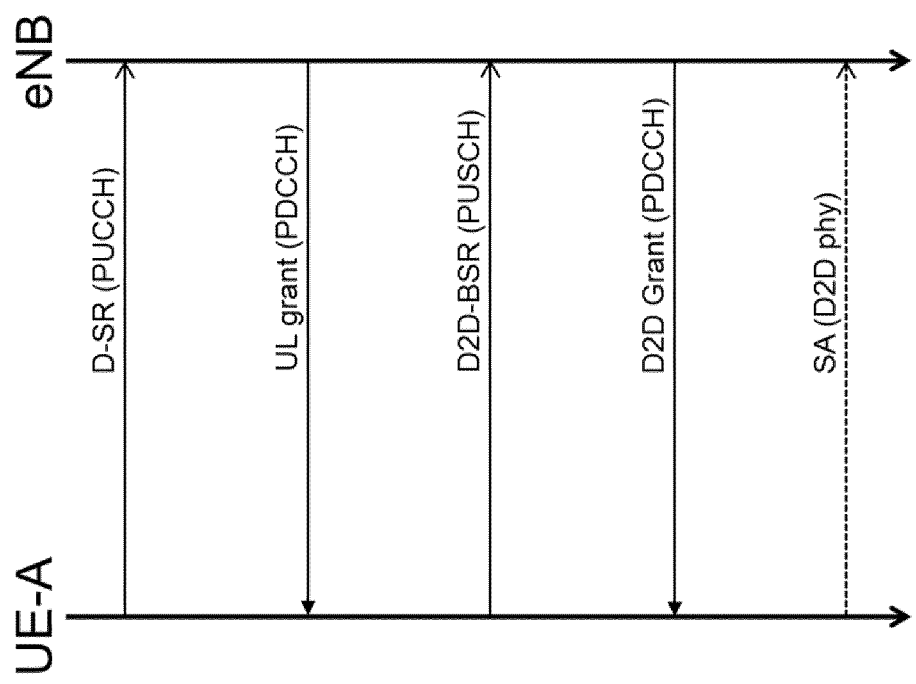
FIG. 7 a ProSe resource grant procedure.

FIG. 7 shows a ProSe resource grant procedure, based on PDCCH monitoring, in which first a UL grant (for cellular operation) is requested by a D2D enabled node and received, and then, based on this grant, a grant for D2D/ProSe resources is requested and received, based on which SA (Schedule Assignment) signaling may ensue.

There is disclosed a D2D enabled node for a wireless communication network. The D2D enabled node is adapted for determining that a D2D resource grant expected by the D2D enabled node is not received from a network node, the D2D enabled node further being adapted for performing one or more actions in response to the determining that the grant is not received. Based on the determination of a missing grant, suitable actions may be taken by the D2D enabled node.

Moreover, a method performed by a D2D enabled node for a wireless communication network is disclosed. The method comprises determining that a D2D resource grant expected by the D2D enabled node is not received from a network node. The method also comprises performing one or more actions in response to the determining that the grant is not received.

A network node for a wireless communication network is suggested. The network node is adapted to instruct a D2D enabled node to trigger a random access procedure to perform switching of the D2D enabled node for a D2D operation mode to a cellular operation mode. This allows changing the operational mode of the D2D enabled node, e.g. in response to a received ProSe BSR. Accordingly, a well-defined behavior of the D2D enabled node may be instructed by the network node, e.g. if no grant is to be sent to the D2D enabled node.

There is also disclosed a method performed by a network node for a wireless communication network. The method comprises instructing a D2D enabled node to trigger a random access procedure to perform switching of the D2D enabled node for a D2D operation mode to a cellular operation mode.

A computer program product comprising instructions executable by control circuitry is considered. The instructions cause the control circuitry to carry out and/or control any of the methods described herein when executed by the control circuitry.

Moreover, there is disclosed a storage medium adapted to store instructions executable by control circuitry, the instructions causing the control circuitry to carry out and/or control any of the methods described herein.

There are described the following methods.

Methods in and/or carried out by a D2D enabled node or UE (and the corresponding methods in a network node), which may comprise any one or any combination of the following steps. The D2D enabled node may be adapted to carry out and/or perform the steps pertaining to/intended to be carried out by it. The network node may be adapted to carry out and/or perform the steps pertaining to or intended to be carried out by it.

Step 0 (Optional): Sending a request for ProSe resources to a network node. This step may be carried out by the D2D enabled node. There may generally be a sending module of a D2D device for sending a request for ProSe resources to a network node for a D2D device.

The request may be an explicit ProSe scheduling request or resource request or an implicit request e.g. in the form of indicting buffer status for ProSe data (e.g., by sending a BSR). Step 1: Attempt or reattempt to receive a ProSe resource grant and/or allocation data corresponding to the grant and/or a request for a grant, and perform one or a combination of the below:

Step 1a: Receive from the network node a message (or allocation data) indicative of that the ProSe resource grant may be not received by the D2D enabled node or UE, for example a grant rejection, or Step 1b: Determining that a ProSe resource grant expected by the UE is not received from a network node.

It should be noted that detecting that the network grant is missing/not received may consist of and/or comprise Step 1a and/or Step 1b.

There may generally be a receiving module of a D2D device for receiving the message and/or determining that a resource grant expected is not received.

Figure 8:
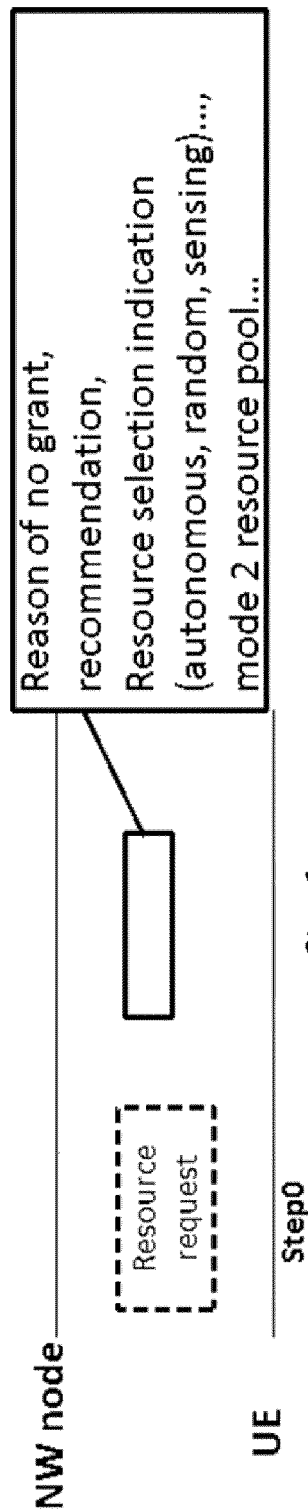
FIG. 8 an exemplary high-level illustration of a method according to one of the approaches described herein.
Figure 9:
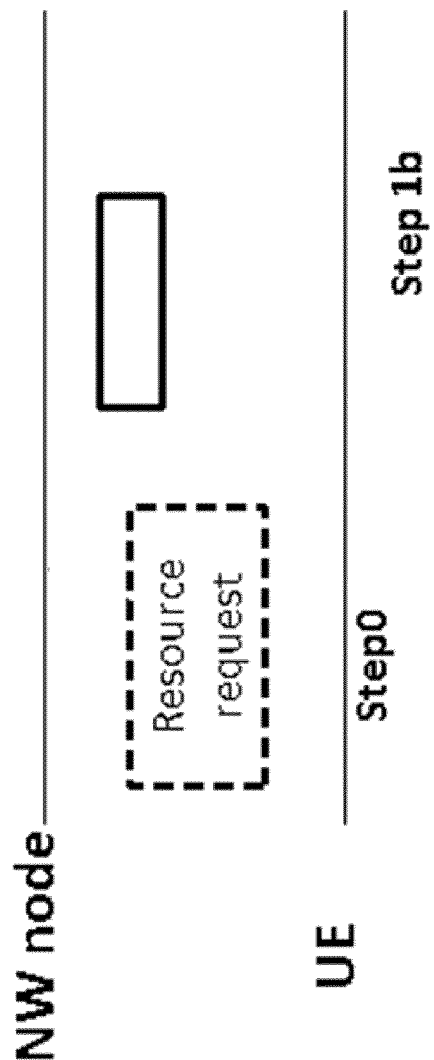
FIG. 9 another exemplary high-level illustration of a method according to one of the approaches described herein.

FIGS. 8 and 9 show UE and network node embodiments as example high-level illustration for Step 1/1a/1b.

Step 2b (in response to Step 1b only): Performing one or more actions in response to the determining that the grant is not received.

Methods in a UE are described in the following. In one further embodiment, the UE behavior in Steps 1 and/or 2 may be further controlled by means of at least one new parameter, e.g., a timer and/or a counter. Thus, methods in the UE of setting and/or controlling these new parameters are also described. A D2D device may comprise a control module for performing this controlling.

A method in a network node for setting and/or controlling parameters (e.g., timers and/or counters) for determining that a ProSe resource grant is not received may be considered. A network device may comprise a parameter module for this setting and/or controlling.

Herein, an uncertain situation occurs when a D2D enabled node or UE expects a ProSe resource grant from a network node (e.g., eNodeB; e.g. because it transmitted a corresponding request) but does not receive it for some reason, e.g., The grant gets delays, The grant has not been transmitted e.g. due to congestion, overload, no resource availability, or The grant with no resources or a message has been received by the D2D enabled node or UE from the network node indicative of that the grant may be not received (grant rejection).

The grant has been transmitted but not received by the D2D enabled node or UE, e.g. due to bad link situation, link congestion etc.

Methods for handling uncertain situations with ProSe resource grant are described in the following in more detail.

A method in and/or carried out by a D2D enabled node or UE may comprise any one or any combination of the following steps. The D2D enabled node or UE may be adapted to carry out each step of a method to be performed by it.

Step 0 (Optional): Sending a request for ProSe resources to a network node. There may be a sending module of a D2D device for this step.

The request may be an explicit ProSe scheduling request or resource request or an implicit request e.g. in the form of indicating buffer status for ProSe data (e.g., by sending a BSR)

Step 1: Attempt or reattempt to receive a ProSe resource grant, and perform one of the below:

Step 1a: Receive from the network node allocation data and/or an indication and/or a message indicative of that the ProSe resource grant may be not received by the D2D enabled node or UE, or Step 1b: Determining that a ProSe resource grant expected by the UE is not received from a network node.

There may be a sending module of a D2D device for this step and/or its variants 1a/1b.

Step 2b (in response to Step 1b only): Performing one or more actions in response to the determining that the grant is not received. There may be one or more suitable modules of a D2D device.

A more detailed example with additional embodiments is also provided.

Examples for step 1a regarding receiving data are elucidated in the following.

In one variant, the allocation data and/or indication and/or message may comprise and/or indicate the reason for not the D2D enabled node or UE not receiving the requested ProSe resource grant (if a grant rejection occurred or is transmitted), e.g., an error case or a descriptive indicator of e.g. congestion, overload, lack of available resources. The indication may also comprise a recommendation or an instruction to the D2D enabled node or UE on the action to take in relation to not receiving the ProSe grant/being rejected, i.e., to resolve the uncertain situation.

In another variant, the message and/or allocation data and/or indication may comprise an indication or a permission to the D2D enabled node or UE that the ProSe resources may be selected in a different way (e.g., selected autonomously by the D2D enabled node or UE, selected randomly by the D2D enabled node or UE, selected based on sensing, etc.). The way of selecting the resources may also be indicated, configured or recommended in the indication and/or message and/or allocation data. Based on this indication, the D2D enabled node or UE may attempt the different way of selecting the ProSe resources.

In another variant, the indication may comprise Mode 2 ProSe resource configuration for the D2D enabled node or UE, e.g., the resources based on Mode 2 resource pools (rather than on Mode 1 resource pools as if it would be the case when the expected ProSe resource grant is received).

The network node generally may be adapted to determine and/or transmit a corresponding indication and/or message and/or allocation data. There may be a request handling module of a network device for performing the corresponding determining and/or transmitting.

Examples for step 1b regarding determining that a grant is not received are elucidated in the following.

In one variant, the D2D enabled node or UE may start the determining from a time when it expects the grant to be received. In another embodiment, the UE may start the determining after sending an implicit or explicit request for ProSe resources (e.g., a SR, ProSe BSR, or a resource request message) or an indication for the need for D2D resources. In another embodiment, the expected ProSe resource grant is considered as missing/not received after a certain time (pre-defined or configurable by the network node), e.g., after 4 ms or after N subframes.

In one variant, the actions may further comprise obtaining one or more parameters for controlling the determining.

In one example, a new timer (e.g., named here in timer_GrantMissingDetection) is defined and is compared to a maximum time (e.g., pre-defined or configurable by a network node or determined by the UE, see section 6.2) during which the UE should keep monitoring the grant from the network node. If there is no grant detected until the timer expires, the UE considers the grant is missing/not received.

In another example, a new counter of the number of attempts may be defined, so that the UE can attempt to receive the grant up to a certain maximum number of times.

There may be a control module for performing any one or any combination of these examples of a D2D device.

Examples for step 2b regarding performing one or more actions are elucidated in the following.

According to this part, the D2D enabled node or UE may be performing one or more actions (in any combination) in response to the determining that the grant or corresponding allocation data or message is not received.

Some example actions are:

Reattempting asking for ProSe network-configurable resources,

Ask the network node for a permission for getting ProSe resources in a different way (e.g., select autonomously), e.g., by sending a corresponding request or indication to the network node, Attempting to get ProSe resources in a different way (e.g., select autonomously such as in Mode 2), which may or may not be in parallel to further attempting to get the ProSe network-configurable resources and/or it may follow a certain number or all of the allowed attempts, Switching to cellular operation mode from ProSe operation, Indicating to the network that ProSe resources are or will be selected in a different way (e.g., select autonomously), e.g., if the D2D enabled node or UE decides to use mode 2 resource due to not receiving the ProSe grant, it may then indicate to the network its decision or its intention, Not triggering a cellular random access procedure in response to the determining that the ProSe grant is not received, which may also be a pre-defined behavior (e.g., applies always) or may be configurable by the network node (e.g. as explained below).

In one variant, the actions may further comprise obtaining one or more parameters for controlling the actions.

In one example, a new timer (e.g., named herein timer_ProSeResourceExit) is defined and is compared to a maximum time (e.g., pre-defined or configurable by a network node or determined by the D2D enabled node or UE, e.g. as explained herein) during which the D2D enabled node or UE should reattempt to fetch resources (from network node or autonomously) until the D2D enabled node or UE gets a feedback from the network node. After the timer expires, the D2D enabled node or UE may consider no resource is available and give up current ProSe transmission.

In another example, a new timer/counter (e.g., named herein timer_Mode1_Only) is defined and is compared to a maximum number of times (e.g., pre-defined or configurable by a network node or determined by the D2D enabled node or UE). Before the timer expires, if D2D enabled node UE does not receive any grant, the D2D enabled node or UE may continue reattempting to request resources and/or the grant from the network or network node only. The request to the network or network node may be to, e.g.:

Reattempt asking for ProSe network-configurable resources (or allocated resources, which may be allocated by the network node), Ask the network node for a permission for getting ProSe resources in a different way (e.g., select autonomously), e.g., by sending a corresponding request or indication to the network node, In this example, after the timer expires, the UE may start getting ProSe resources in a different way (e.g., select autonomously) in parallel to further attempting to request network node, i.e. UE will request resource from the network node, while UE will try to detect and select available mode2 resources.

In yet another example, a new timer/counter (e.g., named here in timer_RandomAccessProcedure) is defined and is compared to a maximum time (e.g., pre-defined or configurable by a network node or determined by the UE). If the timer expires, a random access procedure will be triggered.

There may be a response module of a D2D device for performing and/or controlling the action or actions to be performed. The response module may communicate with and/or control a transmission module, which may be for transmitting requests, and/or a receiving module, which may be for receiving allocation data and/or indications and/or message from the network node.

Methods in a network node for setting and/or controlling parameters related to uncertain situations with the ProSe grant are elucidated in the following.

The network node may be adapted to carry out any one or any one combination of the steps and/or methods described.

According to this part, a network node may set and/or control parameters related to uncertain situations with the ProSe grant. In one example, the parameters may be related to parameters controlling, e.g., a missed detection of the grant (or an expected response to a request and/or corresponding allocation data), number of attempts and/or the trial time for retrying to request the resource, and/or switching the method of obtaining the D2D resources and/or triggering random access and other procedures, etc. The network node may control by parameters and/or setting parameters the behaviors of the D2D enabled node or UE described in variants for Step 2b above, including whether the D2D enabled node or UE should continue trying to get Mode 1 resources, switch to Mode 2, or switch to cellular operation.

When switching the D2D enabled node or UE to cellular operation, in response to a ProSe BSR of the D2D enabled node or UE, the network node may provide to the D2D enabled node or UE (e.g. by determining and/or transmitting corresponding allocation data and/or message and/or indication), e.g., any one or any combination of: an instruction to the D2D enabled node or UE on how to proceed with the mode switching, a cellular resource grant, a cellular resource configuration, an indication that the D2D enabled node or UE should do the switching, etc.

In one further example, a random access procedure may be triggered in response to determining of not receiving of grant, which may be triggered in and/or carried out by the D2D enabled node or UE, e.g. in response to receiving corresponding allocation data from the network node.

In a further variant, the procedure may use a new timer/counter (e.g., timer_RandomAccessProcedure) and the corresponding maximum values. In another example, one or more of the following example timer/counters or their equivalents:
timer_GrantMissingDetection,
timer_ProSeResourceExit,
timer_RequestNetwork,
timer_RandomAccessProcedure.

In a further example, the network node may control (e.g., by means of implicit or explicit signaling) corresponding maximum thresholds for parameters and conditions.

The maximum value of the above timers may be predefined, e.g. defined by the standardization. In an example, the maximum value of these timers may be provided by network node via dedicated signaling, e.g. RRC. In an example, the maximum value of these timers may be provided by network node via common signaling, e.g. system broadcast. In an example, the maximum value of these timers may be calculated from other parameters.

The system behavior may be controlled by providing different maximum value of timer/counter, e.g., one or more of the below:
(maximum value of timer_ProSeResourceExit)==(maximum value of timer_Mode1_Only)>0: after a grant missing, the UE will only reattempt requesting resources from network, i.e. the UE will not start mode 2 resources selection.
(maximum value of timer_ProSeResourceExit)==(maximum value of timer_Mode1_Only)==0: after a grant missing, UE will give up current ProSe transmission, i.e. UE will neither reattempt requesting resources from network node nor select resource autonomously.
(maximum value of Mode1_Only)==0, after a grant missing, UE start selection resources antonomously in parallel with requesting resources from network node.
(maximum value of timer_RandomAccessProcedure)==0, after a grant missing, UE starts random access procedure immediately.
(maximum value of timer_RandomAccessProcedure)==infinite or (maximum value of timer_RandomAccessProcedure)>(maximum value of timer_ProSeResourceExit), UE will never start random access procedure due to a ProSe grant missing.

Generally, the network node may set and/or include and/or transmit corresponding parameters or parameter values in allocation data for the D2D enabled node or UE, which may be part of or comprise controlling the D2D enabled node or UE by parameters. The network node may determine parameters and/or parameter values in any suitable manner.

A non-limiting example for parametrized control of handling the uncertain situations with ProSe resource grant is presented in the following.

Herein, an example for parameterized control of handling the uncertain situations with ProSe resource grant is described. The example, comprise a set of selected embodiments for Steps 0, 1/1a/1b, and 2b. The network node and the D2D enabled node or UE may be adapted to carry out the corresponding steps.

Figure 10:
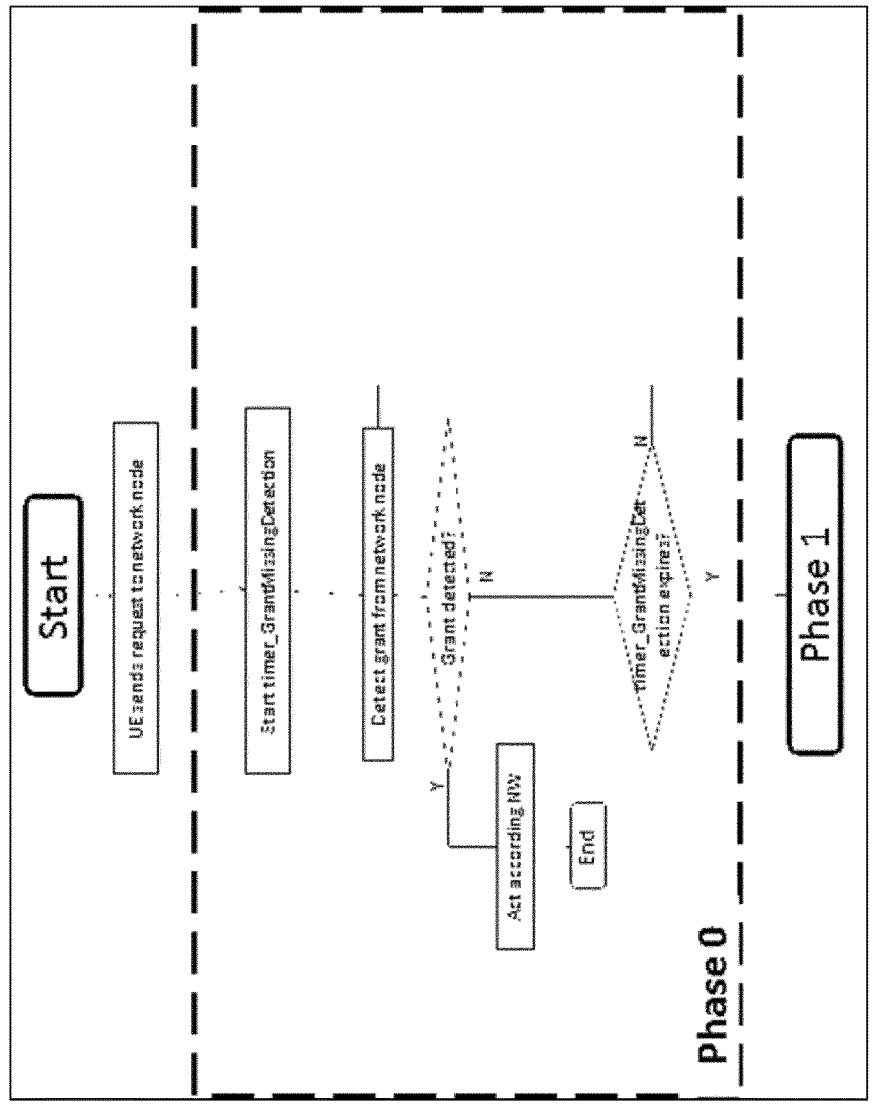
FIGS. 10 and 11 a non-limiting example for parametrized control of handling uncertain situations with ProSe resource grant.
Figure 11:
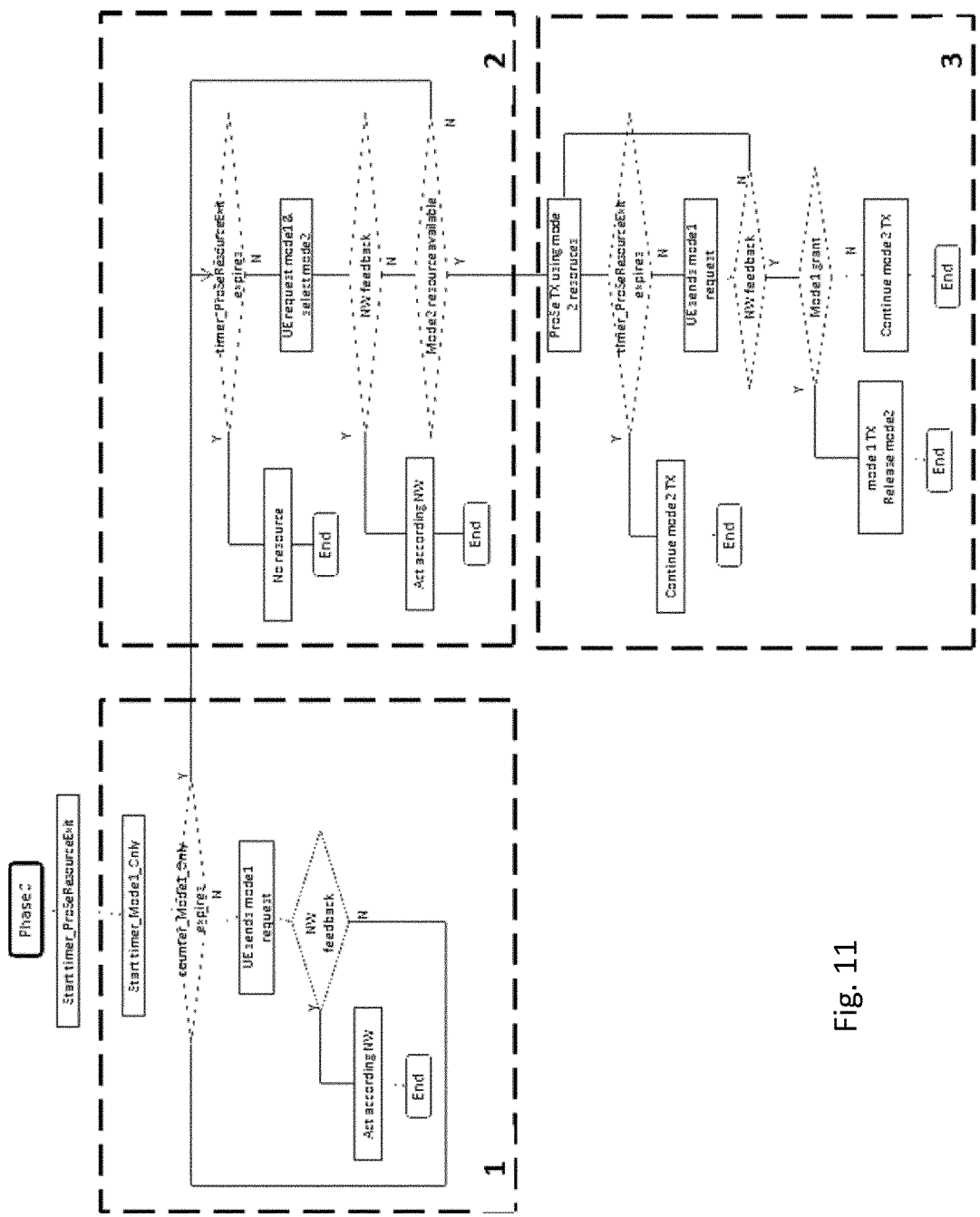

Herein, the overall procedure can be split into four phases (see corresponding flow charts FIGS. 10 and 11):

Phase 0: the D2D enabled node or UE detects the network grant is missing/not received. There may be a detection module of a D2D device for this detecting.

Phase 1: the D2D enabled node or UE should try to request/requests mode 1 resource only. There may be a requesting module of a D2D device for this requesting.

Phase 2: the D2D enabled node or UE tries to request/requests both mode1 resource and to select mode 2 resource. There may be a second requesting module of a D2D device for this requesting, which may be part of the requesting module and/or implemented by the requesting module using a different parameter set.

Phase 3: the D2D enabled node or UE starts mode 2 TX, but still tries to request mode1 resource. There may be a mode setting module of a D2D device for starting mode2 TX.

During phase 0-3, whenever a grant missing is detected, the D2D enabled node or UE may check timer_RandomAccessProcedure. If this timer expires/is expired/expiration of this timer is detected by the D2D enabled node or UE, the D2D enabled node or UE may initiate a random access procedure. There may be a timer module of a D2D device for this checking and/or detecting this expiration. It may be considered that a D2D device comprises a random access module for this initiating of a random access procedure.

In the following, NW may indicate the network node or network side.

Regarding phase 0, the following may be noted.

After sending a request for ProSe resources to a network node, the D2D enabled node or UE starts timer_GrantMissingDetection.

The D2D enabled node or UE may monitor the grant from the network, in particular wait for the grant or generally a request feedback or response message or corresponding allocation data to be transmitted from the network node and/or a corresponding reception of data. If such feedback is received, the UE may follow the network indication, e.g. to use mode1 resource granted or start selecting mode2 resources, etc. When timer_GrantMissingDetection expires and UE does not get any grant from network node, UE reattempt asking for ProSe network-configurable resources, i.e. go to Phase 1.

Regarding phase 1, the following may be noted.

Both timer_ProSeResourceExit and timer_Mode1_Only are running.

UE may continue requesting mode1 resources until it gets/receives feedback from the network. Once feedback is received, the D2D enabled node or UE may follow network indication (in particular an indication provided in the feedback or allocation data): e.g., to either to use mode1 resource granted or start selecting mode2 resources.

When timer_Mode1_Only expires and D2D enabled node or UE has not received any feedback from NW, the D2D enabled node or UE may try mode2 resource, i.e. go to Phase 2.

Regarding phase 2, the following may be noted.

timer_ProSeResourceExit is running, timer_Mode1_Only expires.

During this phase, the D2D enabled node or UE should try both mode1 resource and mode 2 resource.

If the D2D enabled node or UE receives any feedback from NW for mode 1 resource request, the D2D enabled node or UE may act accordingly, in particular follow indications or instructions in the feedback or corresponding allocation data:

If it is mode1 resource grant, the D2D enabled node or UE starts using mode1 resource and stop ongoing resource allocation.

If it is mode2 indication, D2D enabled node or UE stops ongoing mode1 resource request, and continues mode2 resource selection.

If the D2D enabled node or UE selects mode2 resources prior to receiving a mode1 resource grant from the NW, the D2D enabled node or UE may start using mode2 resources. If timer_ProSeResourceExit is still running, the D2D enabled node or UE may continue requesting mode 1 resources, e.g. go to phase 3.

Regarding phase 3, the following may be noted.

timer_ProSeResourceExit is running, timer_Mode1_Only expires.

In this phase, the D2D enabled node or UE may be using mode2 resources, but still request mode 1 resources. If D2D enabled node or UE does not receive any feedback (e.g. allocation data, which may comprise a grant of resources or a grant rejection) from the NW before timer_ProSeResourceExit expires, the D2D enabled node or UE continues using mode2 resources. If D2D enabled node or UE receives any feedback (e.g. allocation data) from NW for mode 1 resource request, the D2D enabled node or UE may act accordingly If it is mode1 resource grant, the D2D enabled node or UE starts using mode1 resource and may release mode2 resource being used.

If it is mode2 indication, the D2D enabled node or UE continues using mode2 resources.

Methods in a network node to use RA in response to ProSe BSR are discussed in the following.

Embodiments here may be combined with other embodiments in other sections.

According to this section, the network node may force and/or instruct (e.g. by determining and/or transmitting corresponding allocation data) the D2D enabled node or UE to trigger a random access procedure, e.g. in response to ProSe BSR, in order to perform switching of the D2D enabled node or UE from the ProSe operation mode to the cellular operation mode.

In one example, the network or network node may instruct and/or trigger the D2D enabled node or UE to perform such switching by not transmitting a ProSe resource grant in response to the ProSe BSR or other ProSe resource request from the D2D enabled node or UE.

In one variant, this switching of the D2D enabled node or UE behavior may be controlled by parameters (e.g., timers, counters, thresholds, etc.), which may be determined and/or transmitted as part of allocation data. In another embodiment, the parameters may be controlled/configured by the D2D enabled node or UE and/or by the network node (see also examples of the parameters herein).

There is also disclosed a D2D enabled node, which may be adapted to perform any one or any one combination of the methods and/or comprise any one or any one combination of the features described herein in the context of a D2D enabled node. The D2D enable node may be a node of and/or for a wireless communication network.

There is also disclosed a network node, which may be adapted to perform any one or any one combination of the methods and/or comprise any one or any one combination of the features described herein in the context of a network node. The network node may be a node of and/or for a wireless communication network.

There is also disclosed a method in a network, which may combine any of the steps of the methods for a D2D enabled node and a network node described herein.

There are also disclosed one or more software devices, e.g. a D2D device and/or a network device comprising suitable modules adapted to perform the steps of any of the methods described herein.

Device-to-device (D2D). In some examples, the terms 'D2D' or 'proximity service' (ProSe) or 'peer-to-peer communication' may be used interchangeably.

A D2D enabled node may be a UE, which may be D2D capable, and may be referred to as D2D capable node or UE. It may comprise any entity or device or node capable of at least receiving or transmitting radio signals on a direct radio link, i.e., between this entity and another D2D capable entity. A D2D-capable device or D2D enabled node may for example be comprised in or comprise a cellular UE, PDA, a wireless device, laptop, mobile, sensor, relay, D2D relay, a small base station employing a UE-like interface, etc. A D2D enabled node or UE is able to support at least one D2D operation. A D2D enabled node may generally be adapted for cellular operation and/or communication in a wireless communication network. A D2D device may be a software/program arrangement arranged to be executable by a hardware device, e.g. control circuitry, and/or storable in a memory of e.g. a UE or terminal, which may provide D2D functionality and/or corresponding control functionality to e.g. a UE or terminal.

A D2D operation may comprise any action or activity related to D2D, e.g., transmitting or receiving a signal/channel type for D2D purpose, transmitting or receiving data by means of D2D communication, transmitting or receiving control or assistance data for D2D purpose, transmitting or receiving a request for control or assistance data for D2D, selecting a D2D operation mode, initiating/starting D2D operation, switching to D2D operation mode from a cellular operation mode, configuring receiver or transmitter with one or more parameters for D2D. D2D operation may be for a commercial purpose or to support public safety, using the data related to D2D. D2D operation may or may not be specific to a certain D2D service. A D2D receive operation may be, and/or be comprised in, a D2D operation, which may, in one example, also involve other than D2D receive operations. A D2D operation may generally be performed or performable by a D2D enabled node or UE. A D2D receive operation may comprise receiving, by a D2D enabled node, of D2D data and/or signals. A D2D transmit operation may comprise, transmitting, by a D2D enabled node, of D2D data and/or signals.

Cellular operation (in particular by UE) may comprise any action or activity related to a cellular network (any one or more RATs). Some examples of cellular operation may be a radio signal transmission, a radio signal reception, performing a radio measurement, performing a mobility operation or RRM related to a cellular network.

D2D transmission may be any transmission by a D2D enable node or device and/or in a D2D operation or mode or communication. Some examples of D2D transmission may comprise physical signals or physical channels, dedicated or common/shared, e.g., reference signal, synchronization signal, discovery channel, control channel, data channel, broadcast channel, paging channel, scheduling assignment (SA) transmissions, etc. A D2D transmission on a direct radio link may be intended for receiving by another D2D device. A D2D transmission may be a unicast, groupcast, or broadcast transmission. A D2D transmission may be on the uplink time-frequency resources of a wireless communication system.

A coordinating or controlling node may be a node or network node that schedules, decides, at least in part, or selects or allocates and/or schedules time-frequency resources to be used for at least one of: cellular transmissions and D2D transmissions. The coordinating node may also provide the scheduling information to another node such as another D2D device, a cluster head, a radio network node such as eNodeB, or a network node (e.g. a core network node, MME, positioning node, D2D server, RNC, SON, etc.).). The coordinating node may communicate with a radio network node. It may be envisioned that a coordinating node may also perform coordination for one or more UEs. The coordination may be performed in a centralized or distributed manner. A coordinating node may provide the functionality of an allocation node. A network device may be a software/program arrangement arranged to be executable by a hardware device, e.g. control circuitry, and/or storable in a memory of a network node, which may provide D2D functionality and/or corresponding control functionality to e.g. network node.

Regarding a radio spectrum, it may be noted that although at least some of the embodiments are described for D2D transmissions in the UL spectrum (FDD) or UL resources (TDD), the embodiments are not limited to the usage of UL radio resources, neither to licensed or unlicensed spectrum, or any specific spectrum at all.

A cellular network or wireless communication network may comprise e.g. an LTE network (FDD or TDD), UTRA network, CDMA network, WiMAX, GSM network, any network employing any one or more radio access technologies (RATs) for cellular operation. The description herein is given for LTE, but it is not limited to the LTE RAT.

RAT (radio access technology) may generally include: e.g. LTE FDD, LTE TDD, GSM, CDMA, WCDMA, WiFi, WLAN, WiMAX, etc.

A network node may be a radio network node or another network node, which may be an allocation node or coordinating node. Some examples of the radio network node are a radio base station, eNodeB, a relay node, an access point, a cluster head, RNC, etc. The radio network node may be comprised in a wireless communication network and may also support cellular operation.

Some examples of a network node, which is not a radio network node may comprise: a core network node, MME, a node controlling at least in part mobility of a wireless device, SON node, O&M node, positioning node, a server, an application server, a D2D server (which may be capable of some but not all D2D-related features), a node comprising a ProSe function, a ProSe server, an external node, or a node comprised in another network. A network node may be considered to be serving a D2D enabled node or UE, if it provides a cell of a cellular network to the served node or D2D enabled node or UE and/or is connected or connectable to the D2D enabled node or UE via and/or for transmission and/or reception and/or UL and/or DL data exchange or transmission.

Multiple carrier frequencies or functionality may refer to any of: different carrier frequencies within the same frequency band or within different frequency bands, same PLMN or different PLMNs, same RAT or different RATs. D2D operation may or may not occur on dedicated carrier frequencies. DL and UL carrier frequencies in FDD are also examples of different carrier frequencies. A frequency band herein may be FDD, TDD, HD-FDD, or even unidirectional (e.g., DL-only band such as Band 29, in some examples). Multiple carrier functionality may include carrier aggregation functionality.

A D2D enabled node may generally be a node adapted to perform D2D communication, in particular transmission and/or reception, and/or at least one type of D2D operations. In particular, a D2D enabled node may be a terminal and/or user equipment. The D2D enabled node may be adapted to transmit and/or receive D2D data based on allocation data, in particular on and/or utilizing resources indicate in the allocation data. D2D communication and/or transmission by a D2D enabled node may generally be in UL resources and/or corresponding carrier or frequency and/or modulation. In this context, stopping D2D communication in response and/or based on a release message may be considered to correspond to transmitting based on allocation data, wherein the release message may be considered to be allocation data.

A receiver or receiver chain may generally be provided by a transceiver arrangement, which may have transmitting capabilities included, or as a separate arrangement, which may be implemented without having transmitting capacities included.

A measurement gap may refer to a time gap or interval, in which no transmission and reception happens, in particular regarding a serving cell or a given carrier. Since there is no signal transmission and reception during the gap (at least in the serving cell or given carrier), a D2D enabled node or UE can switch to another or a target cell or carrier and/or perform a measurement on the target cell or carrier, e.g. for signal quality, utilizing the same receiver.

Generally, there is also disclosed a computer program product comprising instructions executable by control circuitry and/or a computing device, the instruction causing the control circuitry and/or computing device to carry out and/or control any one of the methods described herein when executed by the control circuitry and/or computing device. The control circuitry and/or computing device may be implemented in any one or more than one of the nodes to carry out and/or control corresponding methods or method steps.

Modules performing method steps described herein may generally be implemented in software and/or hardware and/or firmware in and/or on corresponding nodes. Modules of or on or in one node may be implemented in a common module or flow and/or in parallel and/or independent modules or flows.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may be between nodes of a wireless communication network and/or in a wireless communication network. It may be envisioned that a node in or for communication, and/or in, of or for a wireless communication network is adapted for, and/or for communication utilizing, one or more RATs, in particular LTE/E-UTRA. A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes of the communication. It may, e.g., include address data referring to a node of the communication and/or data pertaining to the transmission mode and/or spectral configuration and/or frequency and/or coding and/or timing and/or bandwidth as data pertaining to the process of communication or transmission, e.g. in a header.

Each node involved in communication may comprise radio circuitry and/or control circuitry and/or antenna circuitry, which may be arranged to utilize and/or implement one or more than one radio access technologies. Radio circuitry of a node may generally be adapted for the transmission and/or reception of radio waves, and in particular may comprise a corresponding transmitter and/or receiver and/or transceiver, which may be connected or connectable to antenna circuitry and/or control circuitry. Control circuitry of a node may comprise a controller and/or memory arranged to be accessible for the controller for read and/or write access. The controller may be arranged to control the communication and/or the radio circuitry and/or provide additional services.

Circuitry of a node, in particular control circuitry, e.g. a controller, may be programmed to provide the functionality described herein. A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry.

Radio access technology may generally comprise, e.g., Bluetooth and/or Wifi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered. A node of a wireless communication network may be implemented as a user equipment and/or base station and/or relay node and/or any device generally adapted for device-to-device communication. A wireless communication network may comprise at least one of a device configured for device-to-device communication and/or a user equipment and/or base station and/or relay node, in particular at least one user equipment, which may be arranged for device-to-device communication with a second node of the wireless communication network, in particular with a second user equipment.

A node of or for a wireless communication network may generally be a wireless device configured for wireless device-to-device communication, in particular using the frequency spectrum of a cellular and/or wireless communications network, and/or frequency and/or time resources of such a network. Device-to-device communication may optionally include broadcast and/or multicast communication to a plurality of devices or nodes.

A user equipment (UE) may generally be a device configured for wireless device-to-device communication and/or a terminal for a wireless and/or cellular network, in particular a mobile terminal, for example a mobile phone, smart phone, tablet, PDA, etc. A user equipment may be a node of or for a wireless communication network as described herein, in particular a D2D enabled node. It may be envisioned that a user equipment is adapted for one or more RATs, in particular LTE/E-UTRA. A user equipment may generally be proximity services (ProSe) enabled. It may be considered that a user equipment comprises radio circuitry and/control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A node or device of or for a wireless communication network, in particular a node or device for device-to-device communication, may generally be a user equipment. It may be considered that a user equipment is configured to be a user equipment adapted for LTE/E-UTRAN.

A base station may be any kind of base station of a wireless and/or cellular network adapted to serve one or more user equipments. It may be considered that a base station is a node of a wireless communication network. A base station may be adapted to provide and/or define one or more cells of the network and/or to allocate frequency and/or time resources for communication to one or more nodes of a network, in particular UL resources, for example for device-to-device communication, which may be communication between devices different from the base station. Generally, any node adapted to provide such functionality may be considered a base station. It may be considered that a base station comprises radio circuitry and/control circuitry for wireless communication. It may be envisioned that a base station is adapted for one or more RATs, in particular LTE/E-UTRA. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in device-to-device communication, e.g. as a device directly involved or as an auxiliary and/or coordinating node.

Generally, a base station may be arranged to communicate with a core network and/or to provide services and/or control to one or more user equipments and/or to relay and/or transport communications and/or data between one or more user equipments and a core network and/or another base station and/or be Proximity Service enabled. An eNodeB (eNB) may be envisioned as an example of a base station. A base station may generally be proximity service enabled and/or to provide corresponding services. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a coordinating node and/or to allocate resources in particular for device-to-device communication between two nodes of a wireless communication network, in particular two user equipments.

Device-to-device (D2D) communication or operation may generally refer to communication between nodes of a wireless communication network or corresponding operation of one or more nodes, which may utilize the frequency spectrum and/or frequency and/or time resources of the network, in particular according to LTE/E-UTRAN. The communication may be wireless communication. A device in this context may be a node of the wireless communication network, in particular a user equipment or a base station. Device-to-device communication may in particular be communication involving at least one user equipment, e.g. between two or more user equipments.

Device-to-device communication may be relayed and/or provided via a base station or coordinating node or relay node, in particular without interaction with a core network and/or layers of the network above a base station or coordinating node, or be direct communication between two devices, e.g. user equipments, without involvement of a base station or coordinating node and/or with a base station or coordinating node providing merely auxiliary services, e.g. configuration data or a transmission configuration or related information for a message intended for device-to-device communication between user equipments. In the latter case, it may be considered that data and/or signals flowing between the nodes performing device-to-device communication are not transported via the base station and/or coordinating node. In contrast, during cellular communication, network layers above the eNB/base station/coordination node may generally be involved, in particular core layers which may be connected to the eNB/base station/coordinating node via cable/land line.

During device-to-device communication, a message may be provided and/or transmitted and/or received. A message may be considered to be or be represented by a batch of physical layer transmissions and/or may comprise such. A message may comprise information regarding the transmission configuration, in particular regarding related information, e.g. in a header, and/or a payload. A unidirectional message may be a message for connectionless communication and/or for which no prior communication and/or prior connection between the transmitting node and receiving node is necessary and/or available and/or for which no response or no response protocol or no handshake is expected.

A device configured for and/or capable of device-to-device communication, which may be called D2D enabled device or node, may comprise control circuitry and/or radio circuitry configured to provide device-to-device communication, in particular configured to enable proximity services (ProSe-enabled), e.g., according to LTE/E-UTRA requirements. D2D operation or communication and cellular operation or communication may be considered different operation types or modes, which may generally performed using resources from the same pool of available resources, e.g. allocated resources and/or the same carriers.

A storage medium may be adapted to store data and/or store instructions executable by control circuitry and/or a computing device, the instruction causing the control circuitry and/or computing device to carry out and/or control any one of the methods described herein when executed by the control circuitry and/or computing device. A storage medium may generally be computer-readable, e.g. an optical disc and/or magnetic memory and/or a volatile or non-volatile memory and/or flash memory and/or RAM and/or ROM and/or EPROM and/or EEPROM and/or buffer memory and/or cache memory and/or a database.

Allocated resources may generally be frequency and/or time resources. Allocated resources may comprise frequency-related information, in particular regarding one or more carriers and/or bandwidth and/or subcarriers and/or time-related information, in particular regarding frames and/or slots and/or subframes, and/or regarding resource blocks and/or time/frequency hopping information. Allocated resources may in particular refer to UL resources, e.g. UL resources for a first D2D enabled node to transmit to and/or for a second D2D enabled node. Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. an allocation node, may be adapted to determine and/or transmit corresponding allocation data indicating release or de-allocation of resources to one or more D2D enabled nodes, in particular to a first D2D enabled node. Accordingly, D2D resource allocation may be performed by the network and/or by a node, in particular a node within and/or within a cell of a cellular network covering the D2D enabled nodes participating or intending to participate in the D2D communication.

Allocation data may be considered to be data indicating and/or granting resources allocated by the allocation node, in particular data identifying or indicating which resources are reserved or allocated for D2D communication for a D2D enabled node and/or which resources a D2D enabled node may use for D2D communication and/or data indicating a resource grant or release. A grant or resource grant may be considered to be one example of allocation data. It may be considered that an allocation node is adapted to transmit allocation data directly to a node and/or indirectly, e.g. via a relay node and/or another node or base station. Allocation data may comprise control data and/or be part of or form a message, in particular according to a pre-defined format, for example a DCI format, which may be defined in a standard, e.g. LTE. In particular, allocation data may comprise information and/or instructions to reserve resources or to release resources, which may already be allocated. Generally, allocation data may indicate and/or instruct transmission mode and/or configuration, in particular regarding a power level of transmission, e.g. for the first D2D enabled node. The first D2D enabled node may generally be adapted to perform transmission configuration according to allocation data, in particular to set a corresponding power level.

The term "intra-frequency" may refer to issued related to the same frequency/bandwith and/or carrier, e.g. between neighboring cells (which may be provided by different BSs) having the same frequencies available. The term "inter-frequency" may refer to issues related to different frequencies/bandwidths and/or carriers, e.g. between different carriers in a multi-carrier arrangement.

A receiving operation may comprise a measurement operation, e.g. a signal quality measurement, which may be performed in a measurement gap, in which a receiver switching to a carrier/frequency to be measured may be performed.

Receiver switching may generally refer to switch a receiver between D2D operation and cellular operation (or vice versa) and/or to switch between different carriers or frequencies. Receiver sharing may generally described providing a receiver or receiver resource for a different type of operation (D2D or cellular) at least part of the time and/or to use it for different types of operation (D2D or cellular) within a given time interval, e.g. a subframe or frame. Receiver sharing may be arranged or performed by switching the receiver between different operation types or modes, in particular within the given time interval.

A grant may be considered to be expected (e.g., by a D2D enabled node) for example if and/or based on resources (e.g., D2D resources and/or resources for D2D communication) have been requested (for example by the D2D enabled node, e.g., from the network node/network) and/or a corresponding request has been transmitted, e.g. by the D2D enabled node, for example to the network or network node or base station/eNodeB. Such a request may for example comprise and/or be and/or be based on a BSR.

Some useful abbreviations comprise:
3GPP 3$^{rd}$ Generation Partnership Project
Ack/Nack Acknowledgment/Non-Acknowledgement, also NN
AP Access point
BER/BLER Bit Error Rate, BLock Error Rate;
BS Base Station
BSR Buffer Status Report
CoMP Coordinated Multiple Point Transmission and Reception
CQI Channel Quality Information
CRS Cell-specific Reference Signal
CSI Channel State Information
D2D Device-to-device
DL Downlink
EPDCCH Enhanced Physical DL Control CHannel
DL Downlink; generally referring to transmission of data to a node/into a direction further away from network core (physically and/or logically); in particular from a base station or eNodeB to a UE; often uses specified spectrum/bandwidth different from UL (e.g. LTE)
eNB evolved NodeB; a form of base station, also called eNodeB
E-UTRA/N Evolved UMTS Terrestrial Radio Access/Network, an example of a RAT
f1, f2, f3, . . . , fn carriers/carrier frequencies; different numbers may indicate that the referenced carriers/frequencies are different
FDD Frequency Division Duplexing
ID Identity
L1 Layer 1
L2 Layer 2
LTE Long Term Evolution, a telecommunications standard
MAC Medium Access Control
MBSFN Multiple Broadcast Single Frequency Network
NW Network
OFDM Orthogonal Frequency Division Multiplexing
O&M Operational and Maintenance
OSS Operational Support Systems
PDCCH Physical DL Control CHannel
PH Power Headroom
PHR Power Headroom Report
PSS Primary Synchronization Signal
RAT Radio Access Technology
RA Random Access
RE Resource Element
RB Resource Block
RRH Remote radio head
RRM Radio Resource Management
RRU Remote radio unit
RSRQ Reference signal received quality
RSRP Reference signal received power
RSSI Received signal strength indicator
RX reception/receiver, reception-related
SA Scheduling Assignment
SINR/SNR Signal-to-Noise-and-Interference Ratio; Signal-to-Noise Ratio
SFN Single Frequency Network
SON Self Organizing Network
SSS Secondary Synchronization Signal
TX transmission/transmitter, transmission-related
TDD Time Division Duplexing
UE User Equipment
UL Uplink; generally referring to transmission of data to a node/into a direction closer to a network core (physically and/or logically); in particular from a D2D enabled node or UE to a base station or eNodeB; in the context of D2D, it may refer to the spectrum/bandwidth utilized for transmitting in D2D, which may be the same used for UL communication to a eNB in cellular communication; in some D2D variants, transmission by all devices involved in D2D communication may in some variants generally be in UL spectrum/bandwidth/carrier/frequency These and other abbreviations may be used according to LTE standard definitions.

There may be generally considered a method according to any one of the methods described herein, wherein the methods may be for handling ProSe grant application procedures and/or ProSe requests and/or ProSe procedures and/or performed by a D2D enabled node and/or a network node; and/or a D2D enabled node according to one of the D2D enabled nodes described herein and/or adapted to perform one of the methods described herein, in particular a method performed by a D2D enabled node; and/or a network node according to one of the network nodes described herein, wherein the network node may be an eNB and/or a base station and/or an allocating node and/or a coordinating node, and/or a network node adapted to perform one of the methods described herein, in particular a method performed by a network node.

In this description, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

The invention claimed is:

1. A Device-to-Device (D2D) enabled node for a wireless communication network, the D2D enabled node being adapted to:
   determine that a D2D resource grant expected by the D2D enabled node is not received from a network node in response to an indication from the D2D enabled node that the D2D enabled node has data to transmit to another D2D enabled node, and
   perform one or more actions in response to the determination that the D2D resource grant is not received, wherein to perform the one or more actions, the D2D enabled node is adapted to:
      obtain, from the network node, at least two parameters to control the one or more actions, wherein the at least two parameters include parameters to control: a missed detection of the D2D resource grant and a number of attempts for retrying to request the D2D resource grant, and
      attempt to receive the D2D resource grant based on the at least two parameters.

2. A method performed by a Device-to-Device (D2D) enabled node for a wireless communication network, the method comprising:
   determining that a D2D resource grant expected by the D2D enabled node is not received from a network node in response to an indication from the D2D enabled node that the D2D enabled node has data to transmit to another D2D enabled node; and
   performing one or more actions in response to the determining that the D2D resource grant is not received, wherein the performing the one or more actions comprises:
      obtaining, from the network node, at least two parameters to control the one or more actions, wherein the at least two parameters include parameters to control: a missed detection of the D2D resource grant and a number of attempts for retrying to request the D2D resource grant, and
      attempting to receive the D2D resource grant based on the at least two parameters.

3. A non-transitory computer program product comprising instructions executable by control circuitry, the instructions causing the control circuitry to carry out and/or control the method according to claim 2 when executed by the control circuitry.

4. A network node for a wireless communication network, the network node being adapted to:
   set at least two parameters related to a Device-to-Device (D2D) resource grant expected by a D2D enabled device,
   wherein the at least two parameters include parameters to control: a missed detection of the D2D resource grant, a number of attempts and a trial time for retrying to request the D2D resource grant, switching a mode for obtaining D2D resources, and/or triggering a random access procedure; and
   instruct, based on the at least two parameters, the D2D enabled node to trigger the random access procedure to perform switching of the D2D enabled node from a D2D operation mode to a cellular operation mode.

5. A method performed by a network node for a wireless communication network, the method comprising:
   setting at least two parameters related to a Device-to-Device (D2D) resource grant expected by a D2D enabled device,
   wherein the at least two parameters include parameters to control: a missed detection of the D2D resource grant, a number of attempts and a trial time for retrying to request the D2D resource grant, switching a mode for obtaining D2D resources, and/or triggering a random access procedure; and
   instructing, based on the at least two parameters, the D2D enabled node to trigger the random access procedure to perform switching of the D2D enabled node from a D2D operation mode to a cellular operation mode.

6. A non-transitory storage medium adapted to store instructions executable by control circuitry, the instructions causing the control circuitry to carry out and/or control the method of claim 5 when executed by the control circuitry.

* * * * *